United States Patent
Okamoto et al.

(10) Patent No.: US 7,626,633 B2
(45) Date of Patent: Dec. 1, 2009

(54) TWO-AXIAL ROTATIONAL DRIVING APPARATUS AND DRIVEN MEMBER ROTATION CONTROL SYSTEM

(75) Inventors: Takuji Okamoto, Kanagawa (JP); Senzo Katagiri, Aomori (JP)

(73) Assignee: Canon Kabushiki Kaisha, Tokyo (JP)

( * ) Notice: Subject to any disclaimer, the term of this patent is extended or adjusted under 35 U.S.C. 154(b) by 961 days.

(21) Appl. No.: 10/879,294

(22) Filed: Jun. 29, 2004

(65) Prior Publication Data

US 2007/0108354 A1    May 17, 2007

(30) Foreign Application Priority Data

Jul. 2, 2003    (JP)    ............... 2003/270475

(51) Int. Cl.
*H04N 5/225*    (2006.01)
(52) U.S. Cl. ..................... 348/373; 348/374
(58) Field of Classification Search ............ 348/333.06, 348/373, 374, 375, 376
See application file for complete search history.

(56) References Cited

U.S. PATENT DOCUMENTS

| | | | | |
|---|---|---|---|---|
| 4,353,110 A | * | 10/1982 | Ellis | ............... 362/35 |
| 4,379,624 A | | 4/1983 | Miller et al. | |
| 4,945,367 A | * | 7/1990 | Blackshear | ........... 396/427 |
| 5,028,997 A | * | 7/1991 | Elberbaum | ............ 348/143 |
| 5,274,614 A | * | 12/1993 | Yamazaki | ............... 368/28 |
| 5,850,579 A | * | 12/1998 | Melby et al. | ............ 396/427 |
| 6,027,257 A | | 2/2000 | Richards et al. | |
| 6,098,484 A | * | 8/2000 | Bacchi et al. | ......... 74/490.03 |
| 6,147,701 A | * | 11/2000 | Tamura et al. | ............ 348/36 |
| 6,679,490 B2 | * | 1/2004 | Pioquinto et al. | .......... 271/116 |
| 7,046,295 B2 | * | 5/2006 | Hovanky | ............... 348/373 |

FOREIGN PATENT DOCUMENTS

| | | |
|---|---|---|
| FR | 2 704 050 | 10/1994 |
| JP | 2000-47202 | 2/2000 |
| JP | 2000-047292 | 2/2000 |

OTHER PUBLICATIONS

Translation of Naka-cho, Musashino-shi, Pan-Tilt camera equipment, Feb. 18, 2000 from IDS filed Jun. 29, 2004.*
Translation of FR2704050, Viceriat from IDS filed Jun. 16, 2005 Pub Date Oct. 21, 1994.*

* cited by examiner

*Primary Examiner*—Tuan Ho
*Assistant Examiner*—Euel K Cowan
(74) *Attorney, Agent, or Firm*—Cowan, Liebowitz & Latman, P.C.

(57) ABSTRACT

A two-axial rotational driving apparatus is disclosed which achieves a small size and rotational driving with a well-balanced arrangement and higher accuracy. The two-axial rotational driving apparatus comprises a first actuator which rotationally drives a support member on which a driven member is mounted around a first axis through a first rotation member, a second actuator which rotationally drives a second rotation member, a converting mechanism which converts rotation of the second rotation member into rotation around a second axis to rotate the support member around the second axis.

10 Claims, 5 Drawing Sheets

TWO-AXIAL ROTATIONAL DRIVING APPARATUS AND DRIVEN MEMBER ROTATION CONTROL SYSTEM

This application claims priority from Japanese Patent Application No. 2003-270475 filed on Jul. 2, 2003, which is hereby incorporated by reference.

BACKGROUND OF THE INVENTION

1. Field of the Invention

The present invention relates to a two-axial rotational driving apparatus which rotates a driven member such as an image-taking apparatus about two axes.

2. Description of Related Art

Conventionally, pan-tilt drive unit apparatuses have been used in which a driven member such as a monitoring camera can be rotationally driven in two-axial directions (for example, a pan direction and a tilt direction).

FIG. 4 shows a conventional pan-tilt drive unit apparatus. The pan-tilt drive unit apparatus has a support member 406 on which a monitoring camera, not shown, is mounted. The support member 406 can be rotated in a pan direction (a direction indicated by an arrow B) and a tilt direction (a direction indicated by an arrow A) (see Japanese Patent Application Laid-Open No. 2000-47292).

A decelerating mechanism 417 is coupled to a tilt motor 411. The support member 406 is coupled to the decelerating mechanism 417. The support member 406 is rotated in the tilt direction about a rotation axis L1 upon reception of a driving force from the tilt motor 411 through the decelerating mechanism 417.

A decelerating mechanism 407 is coupled to a pan motor 401. A case 421 to which the support member 406 is fixed is coupled to the decelerating mechanism 407. When the pan motor 401 is driven, the case 421 is rotated in the pan direction about a rotation axis L2 together with the tilter motor 411 and the decelerating mechanism 417.

FIG. 5 shows another conventional pan-tilt drive unit apparatus. The pan-tilt drive unit apparatus also has a support member 506 on which a monitoring camera is mounted, and differs from the pan-tilt drive unit apparatus shown in FIG. 4 in a mechanism for rotation in a tilt direction.

Specifically, while the pan-tilt drive unit apparatus shown in FIG. 4 has the tilt motor 411 and the pan motor 401 arranged perpendicularly to each other, the pan-tilt drive unit apparatus shown in FIG. 5 has a pan motor 501 and a tilt motor 511 arranged side by side substantially in parallel with a rotation axis L2. This arrangement is used to minimize space (operation space) occupied by the pan-tilt drive unit apparatus rotating in a pan direction.

In FIG. 5, decelerating mechanisms 517A and 517B are coupled to the tilt motor 511, and the support member 506 is coupled to the decelerating mechanism 517B. A decelerating mechanism 507 is coupled to the pan motor 501, and a case 521 to which the support member 506 is fixed is coupled to the decelerating mechanism 507.

When the tilt motor 511 is driven, output from the tilt motor 511 (output for rotation in the pan direction) is converted into output for rotation in the tilt direction by the decelerating mechanisms 517A and 517B to rotate a driven member 506 in the tilt direction. When the pan motor 501 is driven, the case 521 to which the driven member 506 is fixed is rotated in the pan direction together with the tilt motor 511 and the decelerating mechanisms 517A and 517B.

In the conventional pan-tilt drive unit apparatuses described above, when a monitoring camera is mounted on the support member, the camera is preferably arranged on the rotation axes for pan and tilt (L1 and L2). This is because the camera can be rotated easily in an intended direction and the apparatus (a pan-tilt zoom unit apparatus) can be miniaturized as a whole.

In the pan-tilt drive unit apparatus shown in FIG. 4, if a camera is arranged on the rotation axes for pan and tilt (L1 and L2) and the pan motor 401 is driven, the tilt motor 411 is rotated in the pan direction together with the camera. Thus, the pan motor 401 is arranged at a position which does not overlies the rotation trajectory of the tilt motor 411 to avoid interference with the rotation of the tilt motor 411 in the pan direction.

On the other hand, in the pan-tilt drive unit apparatus shown in FIG. 5, the pan motor 501 and the tilt motor 511 are arranged substantially in parallel to reduce the space (operation space) occupied by the tilt motor 511 moving during rotation in the pan direction. Thus, in the pan-tilt drive unit apparatus, the operation space of the whole apparatus can be miniaturized as compared with the pan-tilt drive unit apparatus shown in FIG. 4.

Even in the pan-tilt drive unit apparatus shown in FIG. 5 having the pan motor 501 and the tilt motor 511 arranged in the same direction, however, it is still necessary to ensure space for arranging the pan motor 501 aside from the space occupied by the rotation trajectory of the tilt motor 511.

In other words, in each of the pan-tilt drive unit apparatuses shown in FIGS. 4 and 5, the minimum space required in addition to the space occupied by the driven member such as a camera includes the space for arranging the pan motor, the space for arranging the tilt motor, and the space for ensuring the rotation trajectory of the tilt motor.

In addition, in the pan-tilt drive unit apparatuses shown in FIGS. 4 and 5, the tilt motor is arranged only on one side of an output shaft of the pan motor, so that the mass centered on the output shaft of the pan motor is out of balance. Thus, highly accurate driving is difficult to achieve.

For example, high-definition cameras tend to have larger lenses to provide finer images. In association therewith, motors incorporated in pan-tilt drive unit apparatuses are increased in size.

To address this, a contemplated approach is to provide a weight on the opposite side to the tilt motor to adjust the mass balance around the output shaft of the pan motor. However, the pan motor requires a higher driving torque corresponding to the added weight, which represses a miniaturization in size of the pan motor.

These problems apply to a pan-tilt drive unit apparatus having a structure in which a pan motor is rotated together with a driven member when a tilt motor is driven.

SUMMARY OF THE INVENTION

It is an object of the present invention to provide a two-axial rotational driving apparatus and a driven member rotation control system which have small sizes and allow rotational driving with high accuracy.

In accordance with one aspect of the present invention, a two-axial rotational driving apparatus comprising a first rotation member and a second rotation member which are rotatable independently of each other around a first axis, a support member on which a driven member is mounted, a first actuator which rotationally drives the support member around the first axis through the first rotation member, a second actuator which rotationally drives the second rotation member, a converting mechanism which converts rotation of the second rotation member into rotation around a second axis extending in a direction different from the first axis to rotate the support member around the second axis.

These and other characteristics of the two-axial rotational driving apparatus and the driven member rotation control system will become apparent from the following specific description of Embodiments 1 and 2 with reference to the drawings.

DETAILED DESCRIPTION OF THE PREFERRED EMBODIMENTS

The following is a description of preferred embodiments of the present invention, with reference to the accompanying drawings.

Embodiment 1

Figure 1:
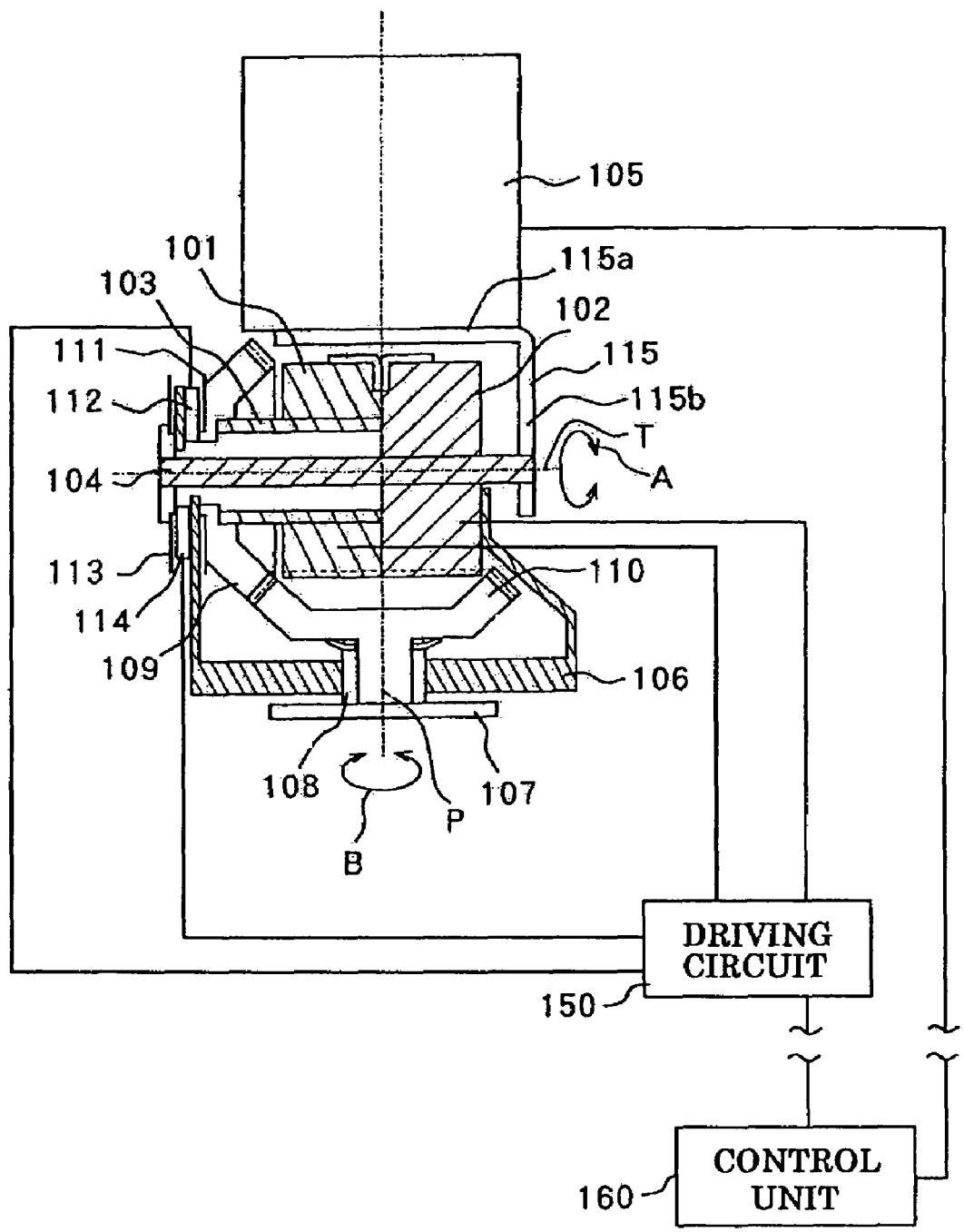
FIG. 1 is a section view showing a two-axial rotational driving apparatus which is Embodiment 1 of the present invention.

FIG. 1 is a section view of a two-axial rotational driving apparatus which is Embodiment 1 of the present invention. Reference numeral 101 denotes a pan electromagnetic motor, and reference numeral 102 denotes a tilt electromagnetic motor arranged adjacent to the pan motor 101.

Reference numeral 103 denotes a hollow pan rotation shaft (a second rotation member) which transmits output from the pan motor 101. Reference numeral 104 denotes a tilt rotation shaft (a first rotation member) which is arranged on the inner periphery of the pan rotation shaft 103 to transmit output from the tilt motor 102. The tilt rotation shaft 104 is rotatably supported by a bearing, not shown, fixed to an upper portion of a housing 106.

Reference numeral 115 denotes a support member of which orientation can be changed in a pan direction (a direction indicated by an arrow B in FIG. 1) and a tilt direction (a direction indicated by an arrow A in FIG. 1) by the two-axial rotational driving apparatus. The support member 115 has a mounting portion 115a on which a camera (a video camera, a television camera, a monitoring camera or the like) 105 is mounted (applied), and a coupling portion 115b which extends downward from one end of the mounting portion 115a. The tilt rotation shaft 104 is fixed (coupled) at one end to the coupling portion 115b.

Reference numeral 107 denotes a base which supports the whole two-axial rotational driving apparatus. Reference numeral 108 denotes a bearing which is fixed to the housing 106 and rotatably supports the housing 106 with respect to a second bevel gear 110, later described.

Reference numeral 109 denotes a first bevel gear which is fixed to another end side of the pan rotation shaft 103 (the another end side means the opposite to the coupling portion 115b of the motors 101 and 102, and this definition applies to the following description), is rotated with the pan rotation shaft 103 together, and engages with the second bevel gear 110. The second bevel gear 110 has a shaft portion at the center in a diameter direction, and the shaft portion is fixed to the base 107.

Reference numeral 111 denotes a pan-encoder scale which is fixed to the first bevel gear 109 and is rotated with the first bevel gear 109 and the pan rotation shaft 103 together. Reference numeral 112 denotes a head which is fixed to the housing 106 at a position opposite to the pan-encoder scale 111. The pan-encoder scale 111 and the head 112 constitute an encoder unit which detects a driving amount of the pan motor 101.

Reference numeral 113 denotes a tilt-encoder scale which is fixed to the other end of the tilt rotation shaft 104 and is rotated with the tilt rotation shaft 104 together. Reference numeral 114 denotes a head which is fixed to the housing 106 at a position opposite to the tilt-encoder scale 113. The tilt encoder scale 113 and the head 114 constitute an encoder unit which detects a driving amount of the tilt motor 102.

A driving circuit 150 which drives the motors 102 and 103 is provided for the two-axial rotational driving apparatus. A control unit (such as a personal computer and an operation unit) 160 serving as a controller is provided at a position away from the apparatus. A control signal for directing pan driving or tilt driving is input to the driving circuit 150 from the control unit 160 through a communication channel such as a LAN channel (wired or wireless), the Internet, Ethernet®, and a dedicated channel. The driving circuit 150 drives the motors 101 and 102 based on the input control signal and a detected signal from the respective encoder units.

The control unit 160 can also control operation of the camera 105 (including zooming, focusing, start and stop of image-taking and the like). This realizes an image-taking system (a driven member rotation control system). Such a structure applies to Embodiment 2 later described, although not shown.

When the tilt motor 102 is driven, its output is transmitted to the support member 115 through the tilt rotation shaft 104 which is rotated about a tilt axis (a first axis) T, thereby rotating the support member 115 and the camera 105 in the tilt direction (the direction shown by the arrow A in FIG. 1).

When the pan motor 101 is driven, output from the pan rotation shaft 103 which is rotated about the same axis (the tilt axis T) as the tilt rotation shaft 104 is transmitted to the first bevel gear 109. Since the second bevel gear 110 is fixed to the base 107, the first bevel gear 109 is revolved about a pan axis (a second axis) P with respect to the second bevel gear 110. In other words, the rotation of the pan rotation shaft 103 about the tilt axis T is converted into the rotation about the pan axis P perpendicular to the tilt axis T. Because the housing 106 is supported by the bearing 108 rotatably with respect to the second bevel gear 110, the motors 101 and 102, the rotation shafts 103 and 104, the support member 115, and the camera 105 rotate about the pan axis P as the center together, depending on the revolution of the first bevel gear 109.

In the two-axial rotational driving apparatus of Embodiment 1, since the pan motor 101 and the tilt motor 102 are arranged adjacent to each other on the tilt axis T (arranged particularly in contact with each other), the space (volume) occupied by the motors 101 and 102 in the apparatus is minimized. In addition, since the tilt rotation shaft 104 is arranged inside the pan rotation shaft 103, the space (volume) occupied by the two rotation shafts 103 and 104 in the apparatus is also minimized. As a result, the apparatus can be miniaturized as a whole.

Since the two actuators are arranged on the same axis (the tilt axis T), it is easy to realize an arrangement with stable balance of the two actuators around the pan axis P, that is, a well-balanced mass and largely overlapping rotation areas, as compared with the conventional examples.

In Embodiment 1, the pan motor 101 and the tilt motor 102 are arranged on both sides of the pan axis P or with the pan axis P as the center (and in addition, the support member 115 and the camera 105 are arranged near the pan axis P to cause tilt rotation along upper portions of the peripheries of the motors 101 and 102). Thus, the mass of the motors 101 and 102 and even the whole apparatus can be arranged nearly equally on both sides of the pan axis P as the center without providing an extra weight or the like. Consequently, it is possible to reduce vibrations during pan rotation and deterioration of stop accuracy as compared with the conventional examples.

In addition, the pan motor 101 and the tilt motor 102 arranged adjacent to each other allow the two motors 101 and 102 to be arranged on the internal diameter side of the second bevel gear 110 which forms the actual axis in the pan direction. Thus, the rotation trajectories of the two motors 101 and 102 can overlap or be superposed.

The tilt rotation shaft 104 arranged inside the pan rotation shaft 103 enables the rotation shafts 103 and 104 to be extended coaxially on one side (on the other end side) of the tilt axis T, so that the two encoder units which detect rotation of the rotation shafts 103 and 104 (that is, rotation of the motors 101 and 102) can be arranged collectively and coaxially on the one side (on the other end side) of the tilt axis T. Since the tilt rotation shaft 104 is coupled at the one end side, opposite to the encoder units, to the support member 115, the rotation trajectories (rotation space) of the encoder units and the coupling portion 115b generally overlap or are superposed. It is thus possible to easily realize the arrangement of the two actuators on the same axis and the arrangement of the encoder units serving as detectors with small space.

In addition, in Embodiment 1, the two bevel gears 109 and 110 are arranged by using the space between the two motors 101 and 102 and the encoder units and the space along lower portions of the peripheries of the motors 101 and 102. In other words, the two bevel gears 109 and 110 are arranged to occupy both the spatial areas described above. This can realize the efficient arrangement to repress an enlargement of the apparatus even when the apparatus has the bevel gears (converting mechanisms) 109 and 110 which are relatively large members.

Therefore, it is possible to realize a two-axial rotational driving apparatus which has a smaller size and allows rotational driving with higher accuracy as compared with the conventional examples.

While Embodiment 1 has the two motors arranged on the tilt axis T in the order of the pan motor 101 and the tilt motor 102 from the encoder units, the order is reversed. Also, the tilt rotation shaft 104 is arranged inside the pan rotation shaft 103 in Embodiment 1, but the pan rotation shaft 103 may be arranged inside the tilt rotation shaft 104. In addition, while the two motors are arranged on the tilt axis T in Embodiment 1, the two motors may be arranged on the pan axis P.

Figure 2:
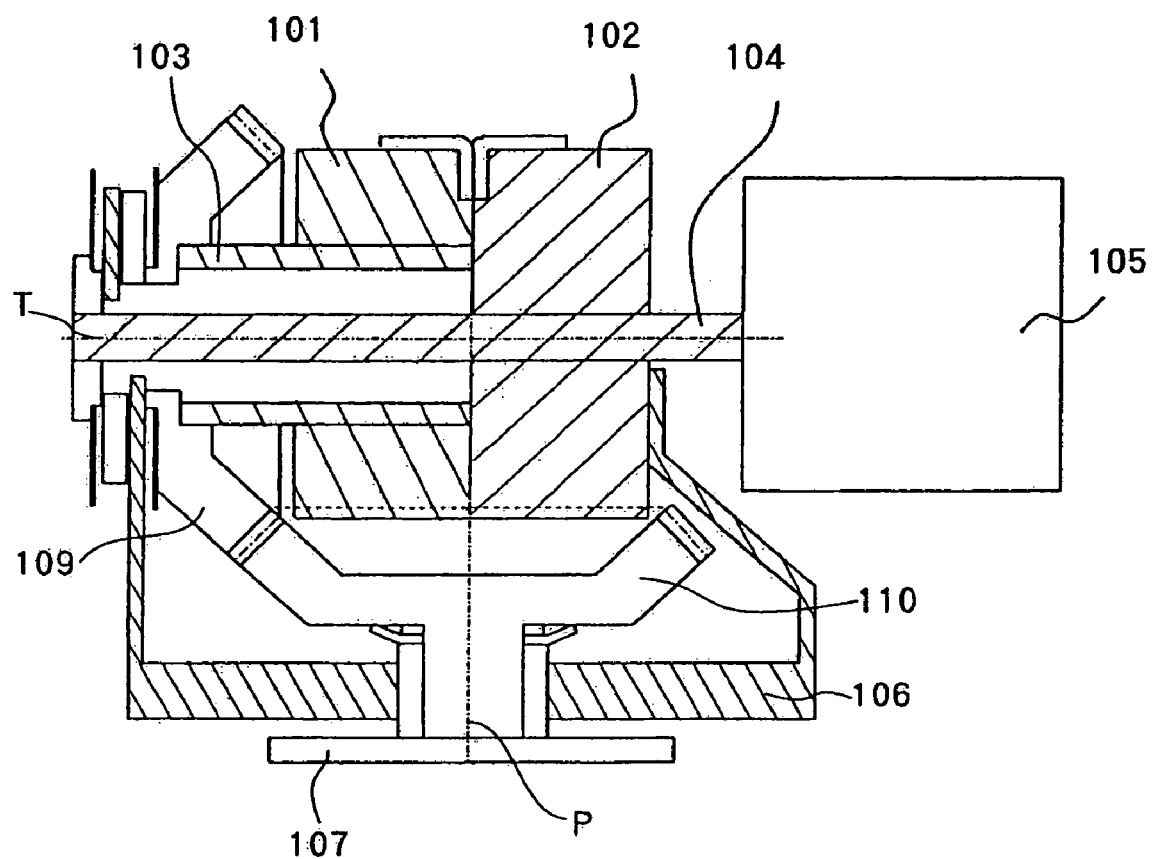
FIG. 2 is a section view showing a variation of the two-axial rotational driving apparatus of Embodiment 1.

The position of the camera 105 serving as a driven member is not limited to the position shown in FIG. 1. For example, as shown in FIG. 2, the camera 105 may be provided on an extension line of the one end of the tilt rotation shaft 104.

Embodiment 2

Figure 3:
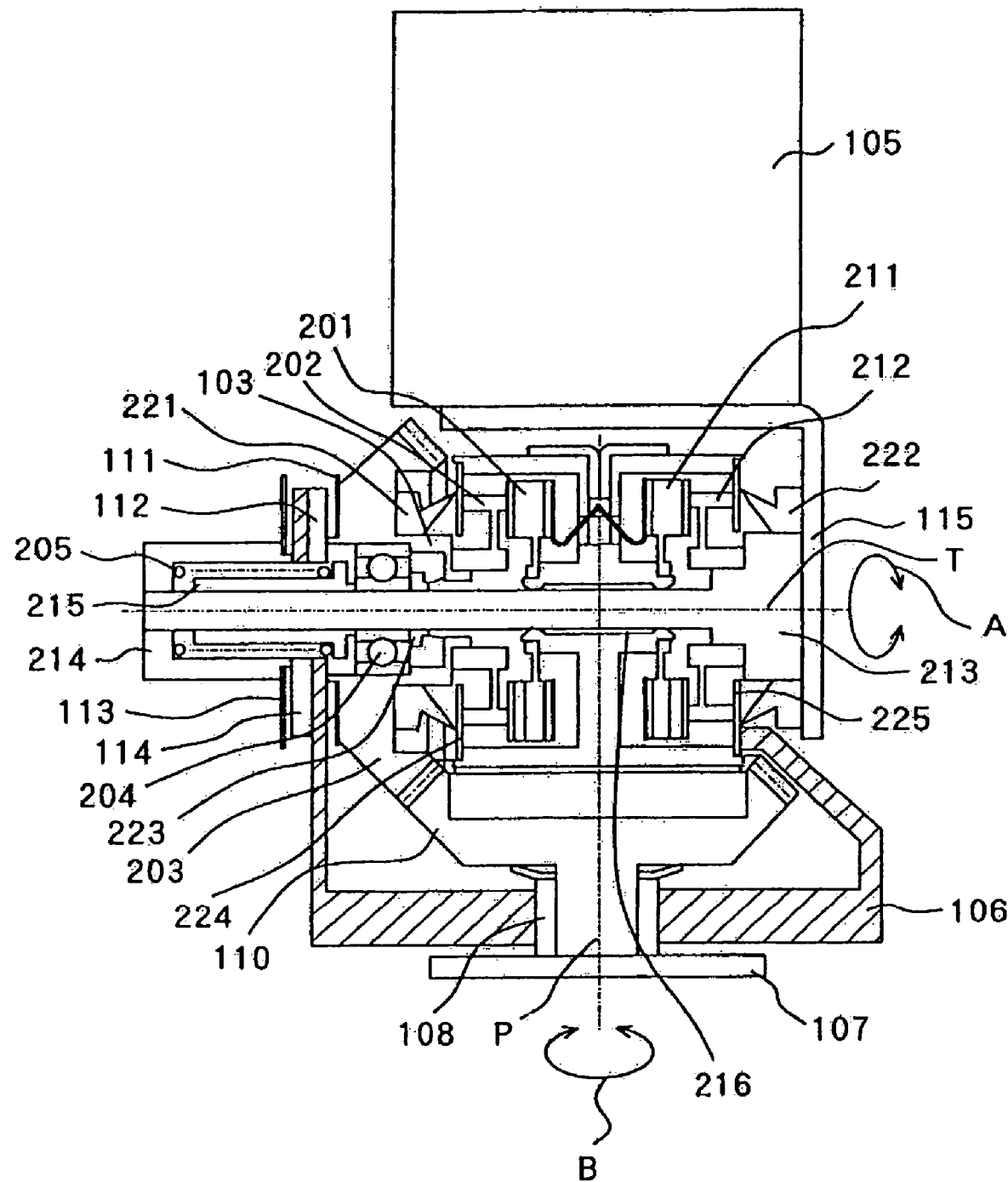
FIG. 3 is a section view showing a two-axial rotational driving apparatus which is Embodiment 2 of the present invention.
Figure 4:
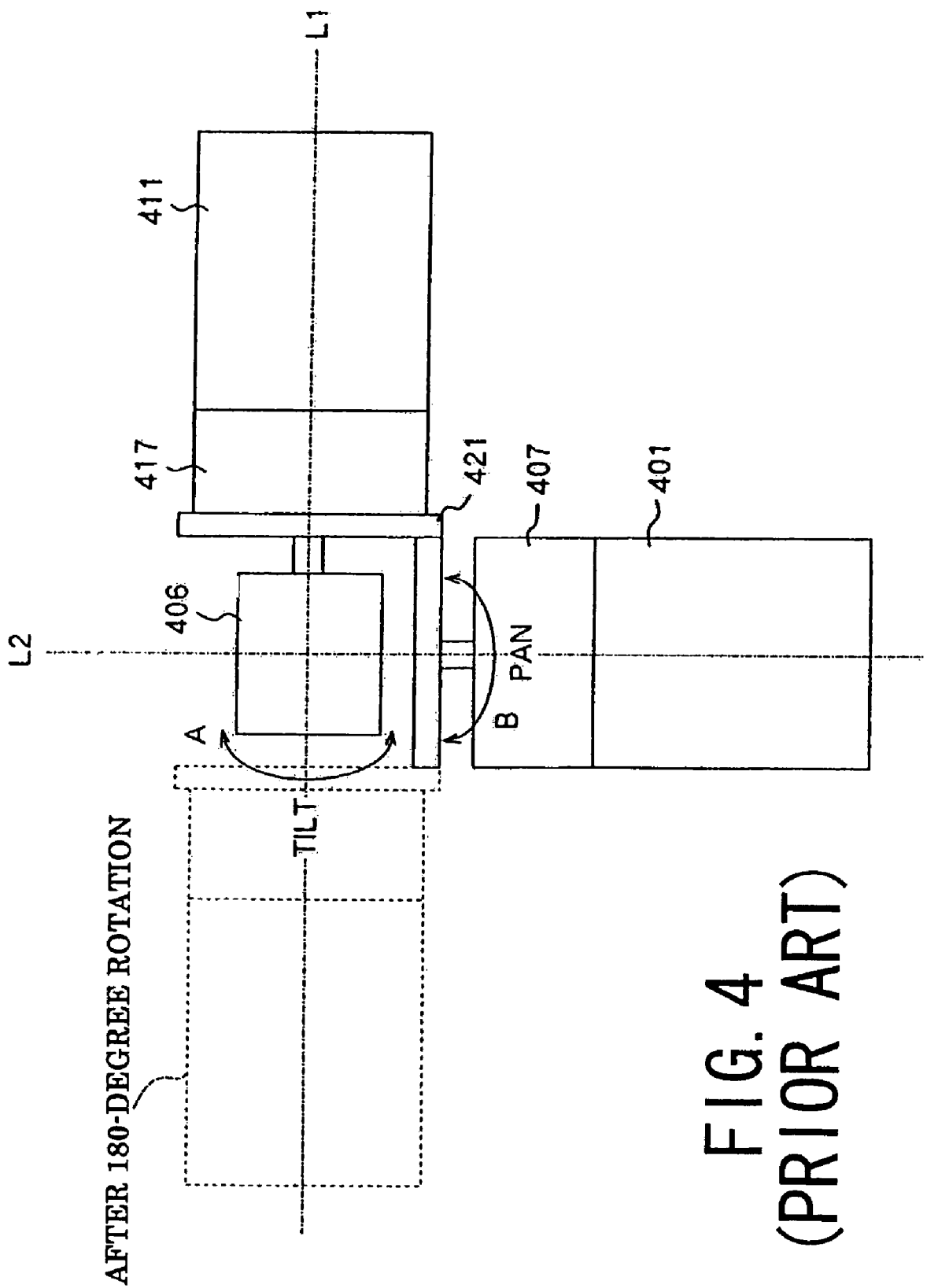
FIG. 4 is a section view of a conventional two-axial rotational driving apparatus.
Figure 5:
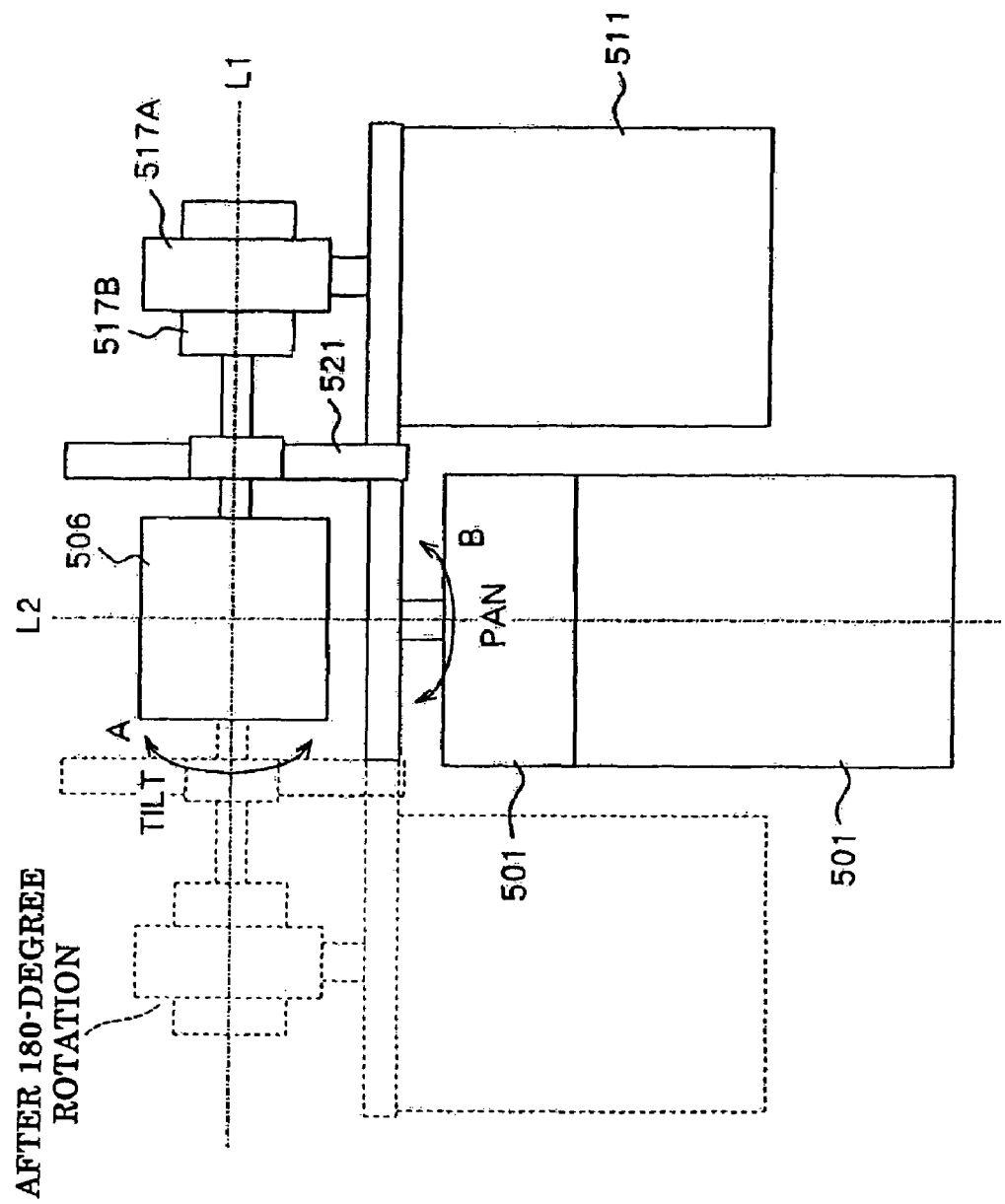
FIG. 5 is a section view of another conventional two-axial rotational driving apparatus.

FIG. 3 shows a section view of a two-axial rotational driving apparatus which is Embodiment 2 of the present invention. While Embodiment 1 applies the electromagnetic motors as the actuators of the two-axial rotational driving apparatus, Embodiment 2 applies vibration type motors (also referred to as ultrasonic motors or the like) as actuators.

The vibration type motor used in Embodiment 2 has a vibrating member which comprises of elastic body (a vibrating body) made of metal or the like formed in an annular shape and a piezoelectric element (an electro-mechanical energy conversion element) fixed to a bottom surface of the elastic body and having a predetermined electrode pattern formed thereon. A plurality of frequency waves signals with different phases is applied to the piezoelectric element to generate a traveling wave on a surface of the elastic body.

Specifically, a plurality of standing waves formed by the plurality of frequency waves signals are provided with a predetermined phase difference in time (two standing waves: the phase deference is 90 degrees, three standing waves: the phase deference is 120 degrees.), the plurality of standing waves are combined to generate a traveling wave which travels along the annular ring shape on the surface of the elastic body. At this point, each material particle on the surface of the elastic body is in elliptic motion. When a rotor (a contacting member) is brought into press contact with the surface of the elastic body, frictional force between the rotor and the surface of the elastic body in elliptic motion causes the rotor to rotationally move in a direction opposite to the traveling direction of the traveling wave. In this manner, motor output is provided.

The easiest method of bringing the rotor into press contact with the elastic body is to press the rotor against the elastic body by a spring, and the pressurizing force is readily adjusted in this method.

Basic structures in Embodiment 2 are similar to those in Embodiment 1, including a pan actuator and a tilt actuator arranged adjacent to each other on a tilt axis T, encoder units arranged collectively on one side of the tilt axis (on the opposite side to a coupling portion of a support member to a tilt rotation shaft across the motors), rotation about the tilt axis T converted into rotation about a pan axis P with bevel gears, and the like. The following description is focused on structures different from those in Embodiment 1. Components identical to those in Embodiment 1 are designated with the same reference numerals in Embodiment 1 and description thereof is omitted.

As described above, similarly to Embodiment 1, the two vibration type motors serving as the actuators are arranged adjacent to each other in Embodiment 2. In addition, in Embodiment 2, the two vibration type motors are arranged opposite to each other such that the elastic bodies thereof are opposed to each other.

Specific description is made with reference to FIG. 3. Reference numeral 201 denotes a first vibrating member, and reference numeral 211 denotes a second vibrating member. Each of the vibrating members is formed by fixing a piezoelectric element to an elastic body made of metal or the like, as described above. A flexible printed board for supplying a driving signal (a frequency waves signal) is fixed to the piezoelectric element. Both the vibrating members 201 and 211 are fixed to a housing 106.

Reference numeral 202 denotes a rotor in contact with a sliding member (designated with no reference numeral) provided on a surface of the elastic body of the first vibrating member 201. Reference numeral 212 denotes a rotor in contact with a sliding member (designated with no reference numeral) provided on a surface of the second vibrating member 211.

The first vibrating member 201 and the rotor 202 constitute a pan vibration type motor. The second vibrating member 211 and the rotor 212 constitute a tilt vibration type motor.

Reference numeral 203 denotes a first bevel gear fixed to the rotor 202. The first bevel gear 203 engages with a second bevel gear 110 fixed to a base 107, similarly to Embodiment 1.

Reference numeral 213 denotes a tilt rotation shaft which extends through an inner side of the first vibrating member 201, the rotor 202, and the first bevel gear 203. The rotor 212 of the tilt vibration type motor is coupled to one end of the tilt rotation shaft 213 such that they can be rotated together. A support member 115 is also coupled to the one end of the tilt rotation shaft 213. A camera 105 serving as a driven member is fixed to the support member 115.

A cylindrical case 214 is fixed to the other end of the tilt rotation shaft 213. The tilt rotation shaft 213 is rotatably supported by a bush 216 arranged at the center of the vibrating members 201 and 211 fixed each to the housing 106 such that the tilt rotation shaft 213 is in a state allowed a movement in a thrust direction.

A bearing 204 is arranged at the center of the first bevel gear 203. An outer ring of the bearing 204 is fixed to the first bevel gear 203. An inner ring thereof is fitted in to the tilt rotation shaft 213 to allow the movement in the thrust direction.

A spring case 215 and a coil spring 205 are arranged between the inner ring of the bearing 204 and the case 214. The coil spring 205 energizes the case 214 and the tilt rotation shaft 213 to the left in FIG. 3, and energizes the bearing 204 and the first bevel gear 203 to the right in FIG. 3 through the spring case 215. Therefore a pressurizing mechanism shared between both the vibration type motors is constituted, the pressurizing mechanism presses the rotor 212 fixed to the tilt rotation shaft 213 against the second vibrating member 211, and at the same time, presses the rotor 202 fixed to the first bevel gear 203 against the first vibrating member 201. The coil spring 205 is used by preference as a pressurizing mechanism with readiness of fine adjustments of a pressurizing force due to a smaller spring constant than a conical spring, for example.

Conventionally, it has been supposed that each vibration type motor should need a pressurizing mechanism. According to the structure shown in FIG. 3, the rotors of the two vibration type motors can simultaneously be brought into press contact with the vibrating members by the single coil spring 205. Embodiment 2 employs, as the first and second actuators, the vibration type motors which each produce opposite rotation (relative rotation) of the vibrating member on which vibrations are excited by electro-mechanical energy conversion and the contacting member in press contact with the vibrating member, and the pressurizing mechanism which generates the pressing force for bringing the vibrating member into press contact with the contacting member is shared between both the vibration type motors, thereby reducing space occupied by the pressurizing mechanism, as compared with the case where a pressurizing mechanism is provided for each of the vibration type motors.

Since the pressurizing mechanism is shared between both the vibration type motors as described above, the pressing force acts equally on both the vibration type motors. This can eliminate deviation (imbalance) of amounts of wear caused between the vibrating members and the contacting members of the vibration type motors to provide a longer life of the apparatus. While the coil spring is used by preference as described above, the coil spring involves a large displacement amount to need correspondingly storage space for arrangement thereof. Thus, the structure requiring the only one coil spring can aid a reduction in size of the apparatus.

It should be noted that both the vibration type motors are sealed by seal members 221, 222, 223, and lids 224 and 225.

In Embodiment 2, similarly to Embodiment 1, the tilt rotation shaft 213 which is driven by the tilt vibration type motor is arranged inside a pan rotation shaft 103 which is driven by the pan vibration type motor. This allows the coil spring 205, the spring case 215, the case 214, and encoder units (encoder scale 111, 113 and heads 112, 114) to be collectively arranged on the same axis on one side of the tilt axis T.

Since the first bevel gear 203 and the tilt rotation shaft 213 coupled respectively, to the rotors 202 and 212, are arranged through the bearing 204, they can be rotated independently.

The pan vibration type motor is driven, the first bevel gear 203 is revolved about the pan axis P with respect to the second bevel gear 110. Therefore, the housing 106, the vibration type motors, the support member 115, and the camera 105 are rotated in the pan direction. When the tilt vibration type motor is driven to rotate the tilt rotation shaft 213, the support member 115 and the camera 105 are rotated in the tilt direction. The rotations caused by driving the respective motors as described above are similar to those in Embodiment 1.

In addition, the following points described in Embodiment 1 also apply to Embodiment 2. Specifically, the mass centered on the pan axis P of the motors is arranged nearly equally on both sides. The rotation trajectories of both the motors can overlap or be superposed. The rotation trajectories of the encoder units and the coupling portion of the support member to the tilt rotation shaft generally overlap or are superposed. An increased size of the apparatus can be repressed even it has the bevel gears. Finally, these characteristics enable a miniaturization in size of the apparatus and rotational driving with higher accuracy.

While Embodiment 2 has the two motors arranged on the tilt axis T in the order of the pan motor and the tilt motor from the encoder units, the order is reversed. Also, the tilt rotation shaft is arranged inside the pan rotation shaft in Embodiment 2, but the pan rotation shaft may be arranged inside the tilt rotation shaft. In addition, while the two motors are arranged on the tilt axis T in Embodiment 2, the two motors may be arranged on the pan axis P.

The position of the camera 105 serving as a driven member is not limited to the position shown in FIG. 3. For example, as shown in FIG. 2, the camera 105 may be provided on an extension ling of the one end of the tilt rotation shaft 203.

In addition, while each of Embodiments 1 and 2 has been described for the two-axial rotational driving apparatus which drives the camera as the driven member, a driven member other than the camera may be mounted on and driven by the two-axial rotational driving apparatus of each of Embodiments 1 and 2.

What is claimed is:

1. A two-axial rotational driving apparatus comprising:
   a first rotation member and a second rotation member which are rotatable independently of each other around a first axis;
   a support member on which a driven member is mounted;
   a first actuator which rotationally drives the first rotation member to rotate the support member around the first axis;
   a second actuator which rotationally drives the second rotation member;
   a converting mechanism which converts rotation of the second rotation member into rotation around a second axis extending in a direction different from the first axis to rotate the support member around the second axis;
   a first detector which is fixed to the first rotation member and detects a driving amount of the first actuator; and a second detector which is fixed to the second rotation member and detects a driving amount of the second actuator, wherein the first and second detectors, the first and second actuators and a coupling portion of the support member to the first rotation member are arranged on the first axis, and wherein the first and second actuators are arranged on both sides of the second axis and provided between the first and second detectors and the coupling portion of the support member.

2. The two-axial rotational driving apparatus according to claim 1, wherein the first actuator and the second actuator are arranged adjacent to each other on the first axis.

3. The two-axial rotational driving apparatus according to claim 1, wherein one of the first and second rotation members is arranged inside the other.

4. The two-axial rotational driving apparatus according to claim 1, wherein the converting mechanism is arranged by using a first space between the first and second actuators and the first and second detectors and a second space along peripheries of the first and second actuators.

5. The two-axial rotational driving apparatus according to claim 1, wherein a portion of the support member where the driven member is applied is rotated around the first axis along peripheries of the first and second actuators.

6. The two-axial rotational driving apparatus according to claim 1, wherein each of the first and second actuators is a vibration type motor which produces relative rotation of a vibrating member on which vibrations are excited through electro-mechanical energy conversion and a contacting member in press contact with the vibrating member, and a pressurizing mechanism which produces a pressing force for bringing the vibrating member into press contact with the contacting member is shared between both the vibration type motors.

7. A driven member rotation control system comprising: the two-axial rotational driving apparatus according to claim 1; and a driven member which is mounted on the support member.

8. The driven member rotation control system according to claim 7, wherein the driven member is an image-taking apparatus.

9. The driven member rotation control system according to claim 7, further comprising a controller which controls operation of the first and second actuators.

10. The driven member rotation control system according to claim 9, wherein the controller controls operation of the driven member.

* * * * *